United States Patent [19]

Katchman et al.

[11] 4,252,913

[45] Feb. 24, 1981

[54] LOW MOLECULAR WEIGHT POLYPHENYLENE ETHER COMPOSITIONS

[75] Inventors: Arthur Katchman, Delmar; GimF. Lee, Jr., Albany, both of N.Y.

[73] Assignee: General Electric Company, Pittsfield, Mass.

[21] Appl. No.: 76,224

[22] Filed: Sep. 17, 1979

Related U.S. Application Data

[63] Continuation of Ser. No. 936,204, Aug. 24, 1978, abandoned, which is a continuation of Ser. No. 753,542, Dec. 12, 1976, abandoned.

[51] Int. Cl.$^3$ .................... C08L 53/02; C08K 3/40
[52] U.S. Cl. ........................ 525/93; 525/92; 525/98
[58] Field of Search ............... 525/92, 93, 98, 90

[56] References Cited

U.S. PATENT DOCUMENTS

| | | | |
|---|---|---|---|
| 3,231,635 | 1/1966 | Holden et al. | 525/316 |
| 3,257,358 | 6/1966 | Stamatoff | 528/214 |
| 3,306,874 | 2/1967 | Hay | 528/215 |
| 3,333,024 | 7/1967 | Haefele et al. | 260/880 |
| 3,383,435 | 5/1968 | Cizek | 525/151 |
| 3,431,323 | 3/1969 | Jones | 525/314 |
| 3,557,053 | 1/1971 | Miller | 260/45.7 |
| 3,644,227 | 2/1972 | Factor | 260/874 |
| 3,671,487 | 6/1972 | Abolins | 525/165 |
| 3,681,281 | 8/1972 | Juelke et al. | 525/176 |
| 3,810,957 | 5/1974 | Lunk | 260/876 B |
| 3,830,771 | 8/1974 | Cohen et al. | 525/437 |
| 3,833,685 | 9/1974 | Wambach | 525/470 |
| 3,835,200 | 9/1974 | Lee, Jr. | 260/876 B |
| 3,915,926 | 10/1975 | Wambach | 260/45.75 B |
| 3,994,856 | 11/1976 | Katchman et al. | 260/42.47 |
| 4,113,800 | 9/1978 | Lee, Jr. | 260/876 B |
| 4,167,507 | 9/1979 | Haaf | 260/42.47 |

FOREIGN PATENT DOCUMENTS 1358030   6/1974   United Kingdom .

*Primary Examiner*—Hosea E. Taylor
*Assistant Examiner*—Amelia B. Yarbrough
*Attorney, Agent, or Firm*—Morgan, Finnegan, Pine, Foley & Lee

[57] ABSTRACT

There are provided thermoplastic compositions comprising a low molecular weight polyphenylene ether resin which has an intrinsic viscosity of less than about 0.4, preferably less than 0.33 deciliters/gram as measured in chloroform at 30° C., a styrene resin and an elastomeric block copolymer of a vinyl aromatic compound and a conjugated diene. The compositions are moldable to articles having good impact resistance.

20 Claims, No Drawings

LOW MOLECULAR WEIGHT POLYPHENYLENE ETHER COMPOSITIONS

CROSS-REFERENCE TO RELATED APPLICATIONS

This is a continuation of copending application Ser. No. 936,204, filed Aug. 24, 1978, now abandoned which, in turn, is a continuation of application Ser. No. 753,542, filed Dec. 12, 1976, also abandoned.

This invention relates to impact resistant polyphenylene ether resins. More particularly, it pertains to compositions comprising a low molecular weight polyphenylene ether resin, e.g., having a molecular weight of less than about 16,000, a styrene resin and an A-B-A$^1$ type block copolymer. The compositions provide molded articles of good impact strength even though low molecular weight polyphenylene ether resins are normally not impact resistant materials.

BACKGROUND OF THE ART

The polyphenylene ether resins comprise a class of thermoplastic materials characterized by outstanding physical properties, including hydrolytic stability, excellent dielectric properties, a broad temperature use range and dimensional stability at elevated temperatures. They can be made by a variety of catalytic and non-catalytic processes from the corresponding phenols or reactive derivatives thereof. In general, they are prepared by the oxidative coupling of a phenolic compound with a complex copper catalyst. By way of illustration, descriptions of the preparation of polyphenylene ether resins are contained in Hay, U.S. Pat. No. 3,306,874 and 3,306,875 and in Stamatoff, U.S. Pat. No. 3,257,357 and 3,257,358, the disclosures of which are incorporated herein by reference.

In the Hay patents, polyphenylene ether resins are prepared by an oxidative coupling method comprising passing an oxygen-containing gas through a reaction solution of a phenol and a metal-amine complex catalyst. In the Stamatoff patents, polyphenylene ethers are prepared by reacting the corresponding phenolate ion with an initiator, e.g., an acid peroxide, in the presence of a complexing agent.

In Cizek, U.S. Pat. No. 3,382,435, incorporated herein by reference, it is disclosed that polyphenylene ethers and styrene resins are combinable in virtually all proportions to provide compositions having many properties improved over those of either of the components.

It has been proposed that compositions of polyphenylene ether resin and polystyrene can be modified by the inclusion of block copolymers of the vinyl aromatic compound, e.g., styrene, and a conjugated diene, e.g., butadiene. Such compositions, which have excellent impact resistance, are disclosed in U.S. Pat. No. 3,994,856 assigned to the same assignee as herein. Compositions of a polyphenylene ether resin, a styrene resin and a block copolymer of an aromatic hydrocarbon such as styrene and a conjugated diene such as butadiene which has had its unsaturation reduced to less than 10% of its original value have also been proposed. These are disclosed in U.S. Pat. No. 4,167,507 and assigned to the same assignee as herein.

In formulating the aforementioned thermoplastic compositions, it has generally been thought that the use of polyphenylene ether resins of relatively high molecular weight, i.e., 16,000 or greater, are essential if good impact strengths are to be obtained in the finished molded article. Such high molecular weight polyphenylene ether resins are characterized by having polymer chains of 130 units or more and intrinsic viscosities, as measured in chloroform at 30° C., of at least about 0.4 deciliters/gram or more.

The physical properties of polymers, in general, are very dependent on molecular weight. It has been observed for example, that the impact strength of a polyphenylene ether resin, as measured by Notched Izod impact, decreases in proportion to a decrease in the intrinsic viscosity and, correspondingly, the molecular weight of the polyphenylene ether. By way of illustration, for a poly(2,6-dimethyl-1,4-phenylene ether)resin having an intrinsic viscosity of about 0.46 deciliters/gram in chloroform at 30° C., a Notched Izod impact of 4.2 ft.lbs./in. is obtained. On the other hand, for a poly(2,6-dimethyl-1,4-phenylene ether)resin of 0.27 deciliters/gram intrinsic viscosity, the Notched Izod impact is only 1.0 ft.lbs./in.

It has now been surprisingly discovered that when a low molecular weight polyphenylene ether resin, i.e., having an intrinsic viscosity of less than 0.4, preferably 0.33, deciliters/gram in chloroform at 30° C., and a styrene resin are combined with an elastomeric block copolymer of a vinyl aromatic compound and a conjugated diene, the resulting compositions possess good impact strengths. The results are unexpected in view of the strong belief in the prior art that low molecular weight polyphenylene ether resins should be avoided where high impact resistance is desired.

DESCRIPTION OF THE INVENTION

According to this invention, there are provided thermoplastic compositions useful for molding, e.g., injection molding, compression molding, transfer molding, and the like, which possess good impact resistance after molding, the compositions comprising:

(a) a low molecular weight polyphenylene ether resin, said resin having an intrinsic viscosity of less than about 0.4 deciliters/gram when measured in solution in chloroform at 30° C.;

(b) a styrene resin, and (c) an elastomeric block copolymer of the A-B-A$^1$ type, wherein terminal blocks A and A$^1$ are the same or different and are polymerized vinyl aromatic hydrocarbons and center block B is a polymerized conjugated diene, the molecular weight of B being higher than the combined molecular weights of A and A$^1$.

The polyphenylene esters (a) are low molecular weight resins having less than 130 structural units per molecule, or a molecular weight of less than 16,000. The intrinsic viscosity of the resin, when measured in solution in chloroform at 30° C., is less than 0.4 deciliters/gram, preferably from about 0.1 to about 0.33 deciliters/gram.

Within the aforementioned limitations, the polyphenylene ether resin is preferably one which is comprised of the formula:

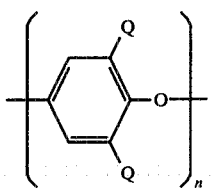

wherein the oxygen ether atom of one units is connected to the benzene nucleus of the next adjoining unit, n is a positive integer and is no greater than about 130, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and phenyl nucleus.

For purposes of the present invention, an especially preferred family of polyphenylene ethers include those having alkyl substitution in the two positions ortho to the oxygen ether atom, i.e., those of the formula wherein each Q is alkyl, most preferably having from 1 to 4 carbon atoms.

The most preferred polyphenylene ether resin for the purposes of this invention is poly(2,6-dimethyl-1,4-phenylene) ether.

In general, the polyphenylene ether resins of this invention can be prepared by following procedures fully described in the abovementioned patents of Hay and Stamatoff. The polyphenylene ethers are self-condensation products of monohydric monocyclic phenols typically produced by reacting the phenols in the presence of a complexing agent or complex metal, e.g., copper catalyst. In general, the molecular weight will be controlled by the reaction time, longer times providing a higher average number of repeating structural units. At some point before a molecular weight of 16,000, or an intrinsic viscosity of 0.4 dl/g (as measured in chloroform at 30° C.) is obtained, the reaction is terminated. Termination can be brought about by the use of conventional means. For instance, in the case of reaction systems which make use of complex metal catalysts, the polymerization reaction can be terminated by adding an acid, e.g., hydrochloric or sulfuric acid, or the like, or a base, e.g., lime sodium hydroxide, potassium hydroxide, and the like, or the product is separated from the catalyst by filtration, precipitation or other suitable means, as taught by Hay in U.S. Pat. No. 3,306,875.

After the product is precipitated and recovered, it may be redissolved and reprecipitated, as desired, to remove impurities. Finally, it is filtered, washed and dried.

The styrene resins (b) are described in detail in Cizek, U.S. Pat. No. 3,383,435. In general, they will have at least 25% by weight of polymer units derived from a vinyl aromatic compound of the formula:

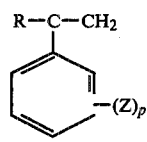

wherein R is hydrogen, (lower)alkyl or halogen, Z is vinyl, halogen or (lower)alkyl; and p is 0 or an integer of from 1 to the number of replaceable hydrogen atoms on the benzene nucleus. Herein, the term "(lower)alkyl" is intended to mean alkyl of from 1 to 6 carbon atoms.

Included among these are homopolymers such as polystyrene and monochloropolystyrene, as well as modified styrene resins, such as rubber-modified high-impact polystyrene, and the styrene containing copolymers such as the styrene-acrylonitrile copolymers (SAN), styrene-butadiene copolymers, styrene-acrylonitrile-α-alkyl styrene copolymers, styrene-acrylonitrilebutadiene copolymers (ABS), poly-α-methylstyrene, copolymers of ethylvinylbenzene and divinylbenzene, copolymers of styrene and maleic anhydride, and copolymers of styrene and EPDM, and the like.

The elastomeric block copolymer (c) is of the A-B-$A^1$ type in which the center and terminal block vary. In the compositions of this invention, the center block, B, is derived from a conjugated diene, e.g., butadiene, isoprene; 1,3-pentadiene, 2,3-dimethyl butadiene, or the like, and terminal blocks A and $A^1$ are derived from a vinyl aromatic compound, e.g., styrene, α-methyl styrene, vinyl toluene, vinyl naphthalene, or the like. In the most preferred compositions, the block copolymer will have terminal blocks A and $A^1$ comprised of polystyrene and center block B comprised of polybutadiene or polyisoprene.

The ratios of the comonomers can vary broadly, so long as the molecular weight of the center block is greater than the combined molecular weights of the terminal blocks. Preferably, within this limitation, the molecular weight of the terminal block will range from about 2,000 to about 100,000 and that of the center block will range from about 25,000 to about 1,000,000.

Such copolymers can be prepared by an organometallic initiation process using, for example, sodium or lithium metal or an organic derivative thereof. The diene monomers can be polymerized with a monofunctional or difunctional initiator, as is described in detail in "Polymer Chemistry of Synthetic Elastomers", edited by Kennedy et al, Interscience Publishers, Vol. 23, Part II (1969), pages 553–559, incorporated herein by reference.

Other methods of preparation are described in Zelinski, U.S. Pat. No. 3,251,905 and Holden et al, U.S. Pat. No. 3,231,635, the disclosures of which are incorporated herein by reference to save unnecessary detail.

Also contemplated for the compositions of this invention are hydrogenated A-B-$A^1$ block copolymers, especially block copolymers of the above type wherein the average unsaturation of the center block, B, has been reduced to less than 20% of its original value.

In the case of the hydrogenated block copolymers, it is preferred to form terminal blocks A and $A^1$ having an average molecular weight of from about 4,000 to about 115,000 and center block B with an average molecular weight of from about 20,000 to about 450,000.

The hydrogenated block copolymers are preferred because they generally provide better thermal stability and flow properties, e.g., melt viscosity, at elevated temperatures than the unhydrogenated block copolymers.

Hydrogenation may be conducted using a variety of hydrogenation catalysts, e.g., nickel, Raney nickel, copper chromate, molybdenum sulfide, finely divided platinum, etc., on a low surface area carrier. The hydrogenation can be carried out at any desired temperature or pressure, from atmospheric to 3,000 p.s.i.g., the usual range being between 100 and 1,000 p.s.i.g., at temperatures of from 75° to 600° F., for a period of time ranging from 0.1 to 24 hours, preferably 0.2 to 8 hours.

The preparation of the hydrogenated block copolymers is described in detail in Jones, U.S. Pat. No. 3,431,323.

Mixtures of unhydrogenated and hydrogenated A-B-$A^1$ block copolymers can also be used as component (c), e.g., from 1 to 99 parts by weight of an unhydrogenated A-B-$A^1$ block copolymer and from 99 to 1 parts by weight of a hydrogenated A-B-$A^1$ block copolymer.

As is taught in Cizek, the polyphenylene ethers and styrene resins are combinable in all proportions, e.g., from 1 to 99 parts of polyphenylene ether resin and from 99 to 1 parts of styrene resin. Similarly, the amount of A-B-$A^1$ block copolymers in the compositions can vary broadly. Preferred compositions will comprise from about 5 to about 95 parts by weight of polyphenylene ether resin (a), from about 95 to about 5 parts by weight of styrene resin (b) and from about 1 to about 25 parts by weight of A-B-$A^1$ block copolymer (c).

Other ingredients can also be included, e.g., pigments, dyes, flame retardants, drip retardants, plasticizers, antioxidants, reinforcing agents, fillers and the like.

A reinforcing agent comprised of fibrous glass is preferred. The filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 and 0.125 (one-eighth) inch.

In general, best properties will be obtained if the sized filamentous glass reinforcement comprises from at least 1 to about 80 parts by weight, based on 100 parts by weight of resin.

In applications where self-extinguishing compositions are required, flame retardant agents may be included. Illustrative flame retardant additives are disclosed in U.S. Pat. No. 3,833,685, U.S. Pat. No. 3,915,926 and U.S. Pat. No. 3,671,487, which are hereby incorporated by reference. Other flame retardants are disclosed in U.S. Pat. No. 3,681,281, and U.S. Pat. No. 3,557,053, U.S. Pat. No. 3,830,771 and U.K. No. 1,358,080, all of which are incorporated by reference.

Special mention is made of flame retardant additives consisting of aromatic carbonate homopolymers having repeating units of the formula:

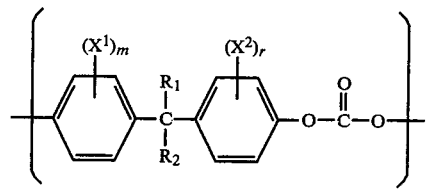

wherein $R^1$ and $R^2$ are hydrogen, (lower)alkyl or phenyl, $X^1$ and $X^2$ are bromo or chloro and m and r are from 1 to 4. These materials may be prepared by techniques well known to those skilled in the art. Also preferred are aromatic carbonate copolymers in which from 25 to 75 weight percent of the repeating units comprise chloro- or bromo-substituted dihydric phenol, glycol or dicarboxylic acid units. See, e.g., A. D. Wambach, U.S. Pat. No. 3,915,926, Procedure A.

The amount of flame retardant additive, if used, is not critical to the invention, so long as it is present in a minor proportion based on said composition—major proportions will detract from physical properties—but at least sufficient to render the polyphenylene ether based resin non-burning or self-extinguishing. These skilled in the art are well aware that the amount will vary with the nature of the resin and with the efficiency of the additive. In general, however, the amount of additive will be from 0.5 to 50 parts by weight per 10 parts of resin.

The compositions of this invention can be prepared by blending the components to form a premix, passing the latter through an extruder at an elevated temperature, e.g., 425° to 640° F., cooling and chopping the extrudate into pellets, and molding them into the desired shape.

DESCRIPTION OF THE PREFERRED EMBODIMENTS

The following examples illustrate the compositions of the invention. They are set forth merely as a further illustration and are not to be construed as limiting the invention in any manner.

EXAMPLES 1-4

Blends of poly(2,6-dimethyl-1,4-phenylene ether) resin, intrinsic viscosity 0.27 deciliters/gram as measured in chloroform at 30° C., a styrene resin (Dylene 8G, ARCO Co., a "crystal" homopolystyrene), and an hydrogenated styrene-butadiene-styrene block copolymer (Kraton G 6521, Shell Chemical Co., Polymers Division) are prepared and injection molded at 550° F. (mold temperature 180° F.), and tested for impact resistance. The formulations and test results are shown in Table 1.

TABLE 1.

Compositions of poly(2,6-dimethyl-1,4-phenylene ether), homopolystyrene and styrene-butadiene-styrene block copolymer

| EXAMPLE | 1 | 2 | 3 | 4 |
|---|---|---|---|---|
| Ingredients (grams) | | | | |
| poly(2,6-dimethyl-1,4-phenylene ether) | 100 | 100 | 150 | 150 |
| homopolystyrene | 600 | 550 | 550 | 550 |
| hydrogenated styrene-butadiene-styrene block copolymer | 250 | 300 | 250 | 300 |
| Properties | | | | |
| Notched Izod impact, ft.lbs./in: | 2.7 | 5.2 | 3.2 | 5.2 |

EXAMPLES 5–7

Blends of poly(2,6-dimethyl-1,4-phenylene ether), having an intrinsic viscosity of 0.31 deciliters/gram as measured in chloroform at 30° C., a high impact rubber modified polystyrene resin (FG 834, Foster-Grant Co.), a styrene-butadiene-styrene block copolymer (as shown in Table 2) and triphenyl phosphate are prepared, molded at 550° F. (mold temperature 180° F.), and evaluated for physical properties. The formulations and properties are shown in Table 2.

TABLE 2.

Compositions of poly(2,6-dimethyl-1,4-phenylene ether), high impact rubber modified polystyrene and styrene-butadiene-styrene copolymer

| EXAMPLE | 5 | 6 | 7 | 7A* |
|---|---|---|---|---|
| Ingredients (parts by weight) | | | | |
| poly(2,6-dimethyl-1,4-phenylene ether) resin | 40 | 40 | 40 | 40 |
| high impact rubber modified polystyrene resin | 60 | 60 | 60 | 60 |
| unhydrogenated styrene-butadiene-styrene block copolymer[a] | 5 | — | 2.5 | — |
| hydrogeneated styrene-butadiene-styrene block copolymer[b] | — | 5 | 2.5 | — |
| triphenyl phosphate | 13 | 13 | 13 | 13 |
| Properties | | | | |
| Tensile yield, psi × $10^{-3}$ | 6.0 | 5.9 | 6.9 | 6.1 |
| Tensile elongation, % | 67 | 63 | 70 | 67 |
| Izod impact, ft.lbs./in. | 5.2 | 2.8 | 5.2 | 2.0 |
| Gardner impact, in. lbs. | 115 | 175 | 230 | 35 |
| Melt viscosity, at 540° F., 1500 $sec^{-1}$ poise | 725 | 550 | 625 | 600 |
| Flow channel length, in. | 29.5 | 34.5 | N.D. | 32 |

*control
[a]K-1101, Shell Chem. Co., Polymers Div.
[b]Kraton G 6521, Shell Chem. Co., Polymers Div.

Obviously, other modifications and variations of the present invention are possible in the light of the above teachings. It is, therefore, to be understood that changes may be made in the particular embodiments described above which are within the full intended scope of the invention as defined in the appended claims.

We claim:

1. A thermoplastic composition which, after molding, has good impact resistance, said composition comprising:

(a) a low molecular weight polyphenylene ether resin, said resin having an intrinsic viscosity of less than 0.33 deciliters/gram when measured in solution in chloroform at 30° C.;

(b) a styrene resin; and (c) an elastomeric block copolymer of the A-B-A[1] type, wherein terminal blocks A and A[1] are the same or different and are polymerized vinyl aromatic hydrocarbons and center block B is a polymerized conjugated diene, the molecular weight of B being higher than the combined molecular weights of A and A[1].

2. A composition as defined in claim 1 wherein the polyphenylene ether resin (a) has an intrinsic viscosity of from about 0.1 to about 0.33 deciliters/gram when measured in solution in chloroform at 30° C.

3. A composition as defined in claim 1 wherein the polyphenylene ether resin (a) is comprised of structural units of the formula:

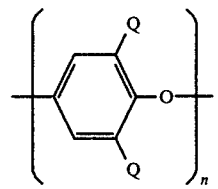

wherein the oxygen ether atom of one unit is connected to the benzene nucleus of the next adjoining unit, n is a positive integer sufficient to provide an intrinsic viscosity no greater than 0.33 deciliters per gram in solution in chloroform at 30° C., each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and phenyl nucleus.

4. A composition as defined in claim 3 wherein each Q is alkyl having from 1 to 4 carbon atoms.

5. A composition as defined in claim 3 wherein said polyphenylene ether is poly(2,6-dimethyl-1,4-phenylene) ether.

6. A composition as defined in claim 1 wherein the styrene resin (b) is a homopolystyrene resin.

7. A composition as defined in claim 1 wherein the styrene resin (b) is a rubber modified high impact polystyrene resin.

8. A composition as defined in claim 1 wherein in A-B-A[1] block copolymer (c), each of terminal blocks A and A[1] has an average molecular weight of from about 2,000 to about 100,000 and center block B has an average molecular weight of from about 25,000 is about 1,000,000.

9. A composition as defined in claim 1 wherein the A-B-A[1] block copolymer (c) is hydrogenated.

10. A composition as defined in claim 1 wherein component (c) comprises from 1 to 99 parts by weight of an unhydrogenated A-B-A[1] block copolymer and from 99 to 1 parts by weight of an hydrogenated A-B-A[1] block copolymer.

11. A composition as defined in claim 9 wherein the average unsaturation of center block B has been reduced to less than 20% of its original value.

12. A composition as defined in claim 9 wherein in said hydrogenated A-B-A$^1$ block copolymer, each of terminal blocks A and A$^1$ has an average molecular weight of from about 4,000 to about 115,000 and center block B has an average molecular weight of from about 20,000 to about 450,000.

13. A composition as defined in claim 1 wherein in the A-B-A$^1$ block copolymer (c), the vinyl aromatic hydrocarbon of terminal blocks A and A$^1$ are selected from the group consisting of styrene, α-methyl styrene, vinyl toluene, vinyl xylene and vinyl naphthalene and the conjugated diene of center block B is selected from the group consisting of butadiene, isoprene, 1,3-pentadiene and 2,3-dimethylbutadiene.

14. A composition as defined in claim 1 which comprises from about 5 to about 95 parts by weight of polyphenylene ether resin (a), from about 95 to about 5 parts by weight of styrene resin (b) and from about 1 to about 25 parts by weight of A-B-A$^1$ block copolymer (c), based on 100 parts by weight of resinous components (a), (b) and (c).

15. A composition as defined in claim 1 which includes a reinforcing amount of a reinforcing agent.

16. A composition as defined in claim 15 wherein said reinforcing agent comprises fibrous glass.

17. A composition as defined in claim 1 which includes a flame retardant amount of a flame retardant agent.

18. A thermoplastic composition having good impact resistance after molding, which comprises:
    (a) from about 5 to about 95 parts by weight of a low molecular weight polyphenylene ether resin having an intrinsic viscosity of less than 0.33 deciliter per gram in solution in chloroform at 30° C.;
    (b) from about 95 to about 5 parts by weight of a styrene resin; and
    (c) from about 1 to about 25 parts by weight of an elastomeric block copolymer of the A-B-A$^1$ type in which terminal blocks A and A$^1$ are the same or different and are polymerized vinyl aromatic hydrocarbons and center block B is a polymerized conjugated diene, the molecular weight of B being higher than the combined molecular weights of A and A$^1$.

19. A composition as defined in claim 1, which includes from 1 to about 80 parts by weight of a filamentous glass reinforcing agent.

20. A composition as defined in claim 1, which includes from 0.5 to 50 parts by weight of an aromatic carbonate homopolymeric flame retardant agent.

* * * * *

UNITED STATES PATENT AND TRADEMARK OFFICE
CERTIFICATE OF CORRECTION

PATENT NO. : 4,252,913

DATED : February 24, 1981

INVENTOR(S) : Arthur Katchman and Gim Fun Lee, Jr.

It is certified that error appears in the above—identified patent and that said Letters Patent is hereby corrected as shown below:

On the title page, item No. 63 should read as follows:
-- Continuation of Ser. No. 936,204, Aug. 24, 1978, abandoned, which is a continuation of Ser. No. 753,542, Dec. 22, 1976, abandoned. --

Signed and Sealed this

Eighteenth Day of August 1981

[SEAL]

Attest:

GERALD J. MOSSINGHOFF

Attesting Officer

Commissioner of Patents and Trademarks